United States Patent
Ron et al.

[19]

[11] Patent Number: 5,839,221
[45] Date of Patent: Nov. 24, 1998

[54] INSECTICIDAL DEVICE

[75] Inventors: Eyal Ron, Tel-Aviv; Neriel Paglin, Ramat-Gan; Yaron Reshef, Natanya; Uri Alon, Moshav Havatzelet Hasharon, all of Israel

[73] Assignee: Ronpal Ltd., Israel

[21] Appl. No.: 428,225

[22] PCT Filed: Nov. 2, 1993

[86] PCT No.: PCT/EP93/03046

§ 371 Date: Jun. 21, 1995

§ 102(e) Date: Jun. 21, 1995

[87] PCT Pub. No.: WO94/09624

PCT Pub. Date: May 11, 1994

[30] Foreign Application Priority Data

Nov. 3, 1992 [IL] Israel ........................................ 103629
Sep. 21, 1993 [IL] Israel ........................................ 107057

[51] Int. Cl.[6] .............................. A01M 1/14; A01M 1/20
[52] U.S. Cl. .............................. 43/132.1; 43/114; 43/131; 239/43; 239/44
[58] Field of Search .................................... 43/131, 132.1, 43/114, 115; 239/42, 43, 44, 47

[56] References Cited

U.S. PATENT DOCUMENTS

| 1,645,715 | 10/1927 | Northrup | 43/115 |
| 3,685,199 | 8/1972 | Bradshaw | 43/114 |
| 3,729,858 | 5/1973 | Bradshaw | 43/114 |
| 3,987,577 | 10/1976 | Hardee | 43/121 |
| 4,992,268 | 2/1991 | Landolt et al. | 43/131 |

FOREIGN PATENT DOCUMENTS

2 468 305  5/1981  France .
66 342  8/1892  Germany .

*Primary Examiner*—Joseph J. Hail, III
*Attorney, Agent, or Firm*—Oppenheimer Wolff & Donnelly LLP

[57] ABSTRACT

An insecticidal device is provided which has a panel of a color having insect attracting properties, preferably yellow, and a spherical body of another color, preferably red. The spherical body is capable of defusing a liquid which contains an insect attractant and is combined with the panel in a manner that they form together an essentially flat panel having hemispherical bulges formed by the spherical body. A specific panel, which can be used as a panel in the above device and can be used as an independent insecticidal device is also provided.

7 Claims, 11 Drawing Sheets

INSECTICIDAL DEVICE

FIELD OF THE INVENTION

The present invention generally concerns a device useful in combating insects, to be referred to hereinafter as "insecticidal device".

BACKGROUND OF THE INVENTION AND PRIOR ART

Controlling insects is a major problem, both in household as well as in agriculture, horticulture and forestry. While conventionally control of insects is performed by spraying an area with an insecticide, such a form of control is very often undesirable due to its adverse ecological effects, as well as its hazardous consequence on the person carrying out the spraying.

In order to circumvent the ecological problems associated with spraying of insecticides, it has been proposed to use diffusers of a poisonous bait liquid. Such diffusers have an absorber body soaked with a liquid comprising an insect attracting agent such as a nutrient or a pheromone, and an insecticide. The insects which are attracted to the absorber body are poisoned and destroyed by the insecticide therein, either upon contact or upon ingestion. One of the major drawbacks of known insecticidal devices of the kind specified is that the absorber body has to be replenished by periodical spraying, which spraying again leads to ecological problems as well as to an acute danger for the person spraying, such an operation being also time consuming and not cost effective.

Devices for use in insect control are disclosed in French Patent Application No. 2,468,305 and in U.S. Pat. No. 4,992,268. The device subject of the French patent application operates on the basis of an adhesive substance which coats an external surface of either panel or a sphere and when an insect lands on the surface of the device, in becomes adhered thereto and thus destroyed. The device subject of the U.S. Patent, which is specifically intended for the monitoring and controlling of the papaya fruit fly, consists of a green or black sphere coated by an adhesive material, which sphere is in combination with a papaya fruit fly sex pheromone held in a tube secured to the sphere and having the property of attracting the flies.

It is the object of the present invention to provide an improved insecticidal device.

GENERAL DESCRIPTION OF THE INVENTION

The present invention has two aspects. An insecticidal device according to the first aspect is based on a novel concept of attracting insects by means of a combination of chemical and visual attractors whereby the insect is diverted from its original target, e.g. a fruit in the case of a fruit fly, towards the insecticidal device. The device in accordance with the second aspect of the invention comprises a novel design of a panel of a kind covered by an adhesive substance whereby insects which come into contact with the panel remain adhered thereto. The panel in accordance with the second aspect may also be used in an insecticidal device in accordance with the first aspect.

According to the first aspect of the present invention there is provided an insecticidal device comprising in combination:

(i) a spherical body holding a liquid or having associated therewith a liquid container, said body being capable of diffusing said liquid into the surrounding atmosphere; said liquid containing an insect attractant and optionally an insecticide;

(ii) a panel of a color which has insect attracting properties, the panel being adapted to combine with said spherical body in a manner that they form together an essentially flat vertical panel having hemispherical bulges on both faces formed by said spherical body.

Said panel may, be of a rigid or a resilient material. The color of the panel and that or the spherical body have to be chosen in accordance with the type of insect to be combatted. For example, in the case of the fruit fly or the olive fly, yellow color is known to act as an attractant and accordingly, in combatting these insects, the panel will preferably be yellow. Furthermore, in the case of the fruit fly, the spherical body will preferably be red.

In a device in accordance with the first aspect of the invention, the insect attraction is achieved by a unique combination of chemical attraction by the liquid diffused into the environment and a visual attraction by means of a color, a color contrast, as well as by the shape of the device.

The diffusion of the liquid from said spherical body can typically be achieved by the use of a diffuser body exposed to the atmosphere and being soaked by the liquid.

The liquid comprises an insect attractant, which may be an agent, such as a pheromone, a nutrient, e.g. sugar or a protein hydrolysate, or any other chemical insect attractant. In addition, the liquid may comprise an insecticidal agent, particularly where the device comprises a diffuser body. In the latter case, the spherical body will be designed so as to allow access of the insects to the diffuser body and upon contact or ingestion of the liquid, the insects will be destroyed.

The spherical body will typically be made of a plastic material.

In accordance with one embodiment of the invention, the liquid is contained within the spherical body. In accordance with another embodiment of the invention, the liquid is contained in a separate container associated with the spherical body adapted to controllably transfer its content of liquid into the spherical body for diffusion. Such an associated container may, for example, form part of said panel.

The spherical body will typically be made of two parts, which in an operational state of the device one forms the top and the other the bottom part of the spherical body. In accordance with one embodiment of the invention, the bottom part has a dish means adapted for holding a liquid and preferably also for holding the bottom portion of a cylindrical diffuser body which is made of an absorbent material. In accordance with this embodiment, the liquid is either contained in a container means within the top part of the spherical body or within a container means forming part of the top part of the panel and which is controllably emptied into the dish means through an appropriate pathway in the upper part of the spherical body.

In accordance with another embodiment of the invention, the container means is an enclosure in the bottom portion of the spherical body and the liquid is being diffused by means of a wick, the bottom of which is imbedded in the liquid; optionally, in order to increase the rate of diffusion, the wick is in contact with a diffuser body in the top portion of the spherical body.

The said panel may be of a rigid or resilient material. The panel may preferably have sticky surfaces, particularly where the liquid does not comprise an insecticide, whereby the insects, upon coming into contact with the panel's surface, become adhered thereto. The sticky surface may be formed by applying an adhesive substance onto to the panel or by attaching to the panel a film having an adhesive surface, etc. If desired, the panel's surface may also be covered by an insecticide.

In accordance with the second aspect of the present invention, there is provided an insecticidal device comprising:

a panel of a color having insect attracting properties; two flexible sheets which are fixed to one and the same edge of the panel and which in a first, storage state of the device, cover each one face of the panel; and an adhesive substance which in said first state is essentially uniformly disposed between each sheet and its respective face of the panel in said first state;

the sheets being capable, in a second, operational state of the device, of being detached each from its respective face of the panel, each sheet having a catch means adapted for engagement with the catch means of the other sheet in a manner that there faces, which in said first state face outwards, come to face one another in said second state.

The device in accordance with the second aspect may be an independent device or may also be used as a panel in the device in accordance with said first aspect. Where the device in accordance with said second aspect is an autonomous device, it may either have a uniform color, particularly yellow, or may also have printed thereon a pattern, e.g. circular, of a different color, e.g. red, which may have an improved insect attracting properties.

The invention will now be illustrated with a description of several specific and non-limiting embodiments, with occasional reference to the annexed drawings;

DETAILED DESCRIPTION OF THE DRAWINGS

FIG. 18(a)–18(c) shows a device in accordance with the second aspect of the invention in three operational states.

DESCRIPTION OF A SPECIFIC EMBODIMENT

Figure 1:
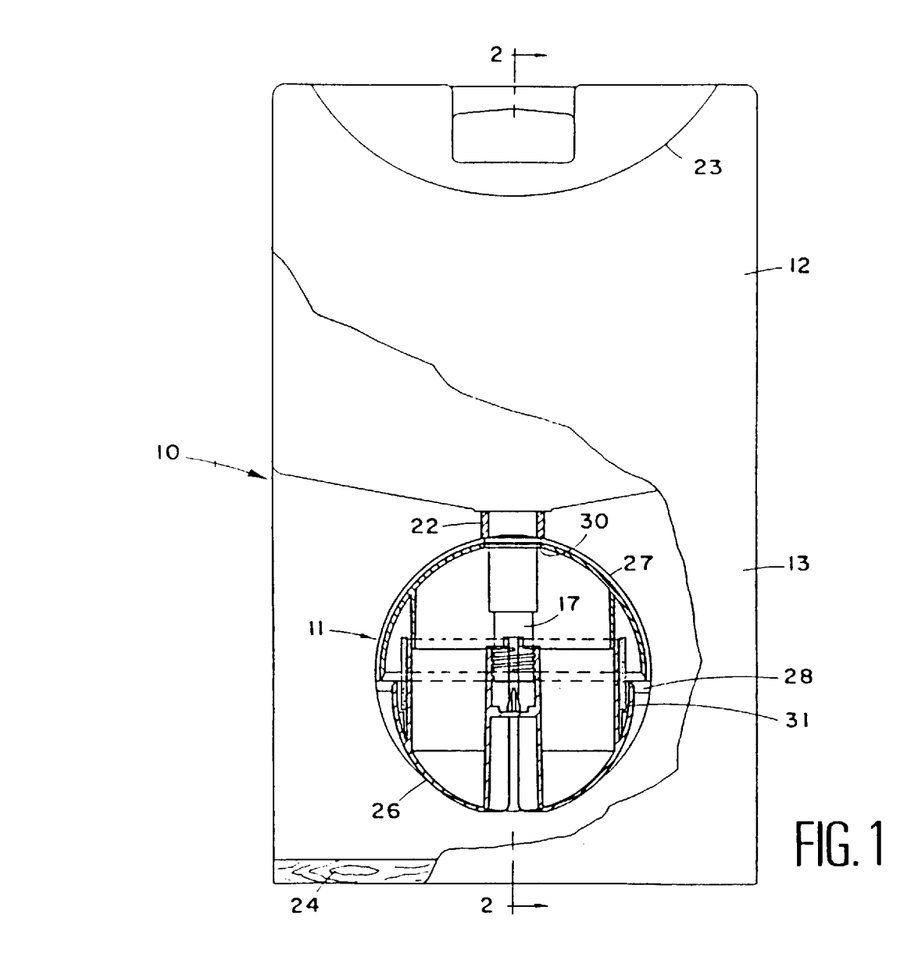
FIG. 1 is a fragmentary front cross-sectional view of a device according to the first aspect of the invention, in a non-operational state.
Figure 2:
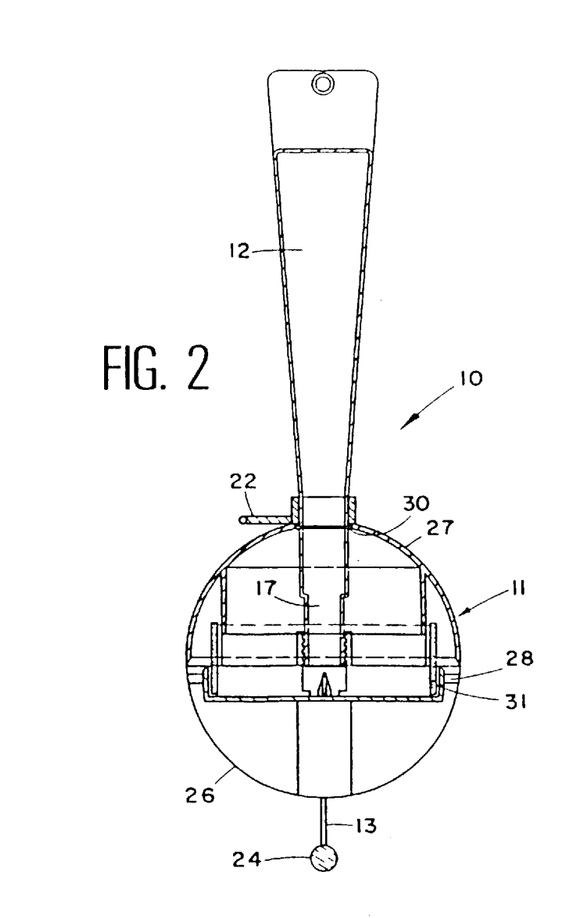
FIG. 2 is a cross-section through lines 2—2 in FIG. 1.
Figure 3:
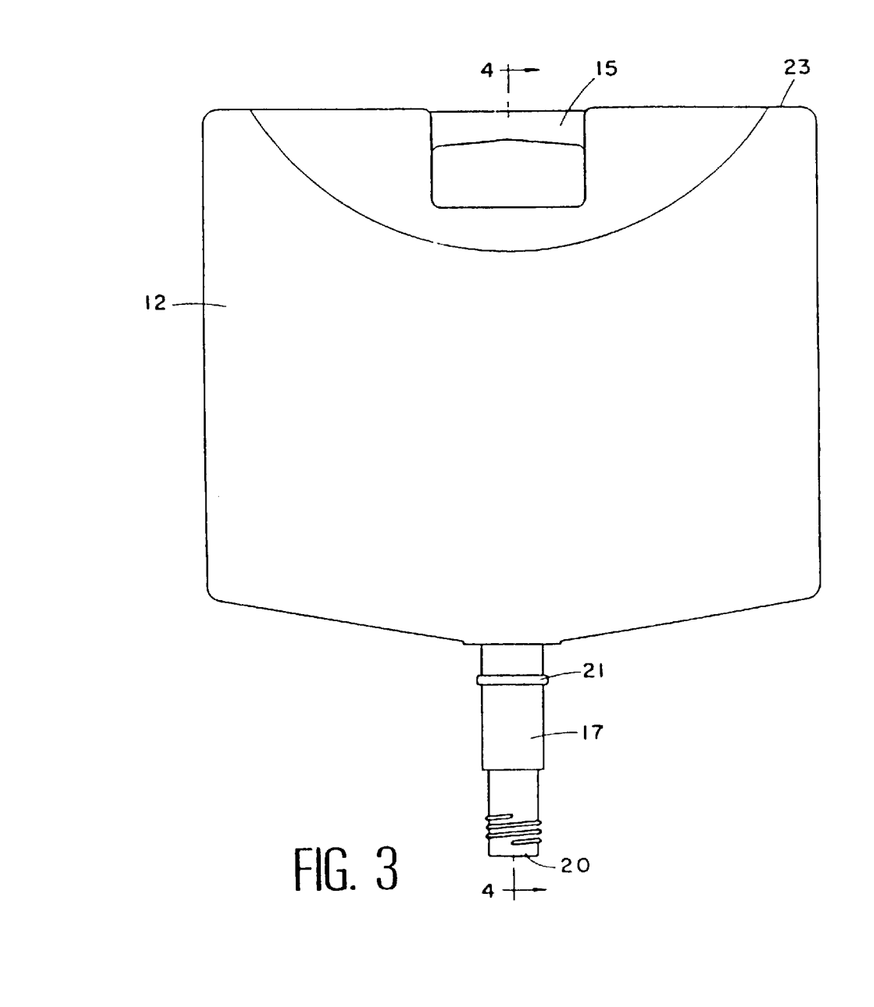
FIG. 3 is a front view of the liquid container of the device of FIG. 1.
Figure 4:
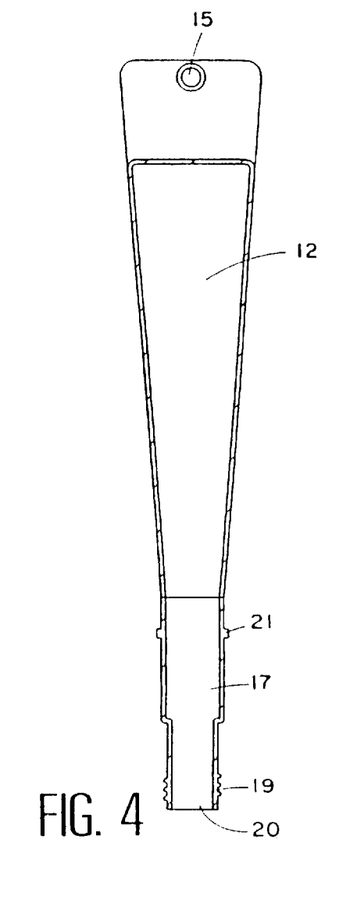
FIG. 4 is a cross-section through lines 4—4 in FIG. 3.
Figure 5:
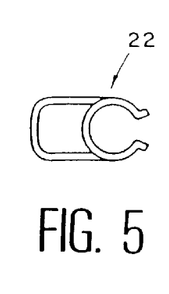
FIG. 5 is a top view of a safety catch.

The device generally designated 10 shown in FIGS. 1 and 2 comprises a spherical body 11, a liquid container 12 and a panel 13. From the reasons already pointed out above the panel has preferably a yellow color and the spherical body has a red or similar color. The container 12 shown in somewhat more details in FIGS. 3 and 4, is made of a material which is inert to the liquids contained therein, and has an essentially rectangular flat shape. Container 12 is fitted at its top with hanging means 15. Container 12 has a neck portion 17 having an externally screw-threaded portion 19, a discharge opening 20 and an annular collar 21. The top of the neck portion is embraced by a safety catch 22 shown in FIG. 5, which prevents unintentional downward screwing which will pierce the discharge opening (see below), Prior to use, this safety catch has to be removed.

Panel 13 is typically a flattened sleeve of a polymeric film that envelopes container 12 and is integral with and extends from the top portion 22 of the container. Panel 13 has a weight rod 24 at its bottom, which serves to keep the bottom portion of the panel straight. Panel 13 has a hole in the middle having a diameter essentially the same as that of the circumferential vertical groove 49 of the spherical body (see below) and by slightly stretching the panel the hole boundaries may be fitted into groove 49, and these two members thus combine to form together an essentially flat panel with hemispherical bulges on both of its faces formed by the spherical body.

As can be seen, spherical body 11 has a bottom hemisphere 26 and a top hemisphere 27, separated from one another by an external peripheral gap 28. The neck portion 17 of container 12 fits through an opening 30 in top hemisphere 27 and rests into a dish means 31 in the bottom hemisphere.

Figure 6:
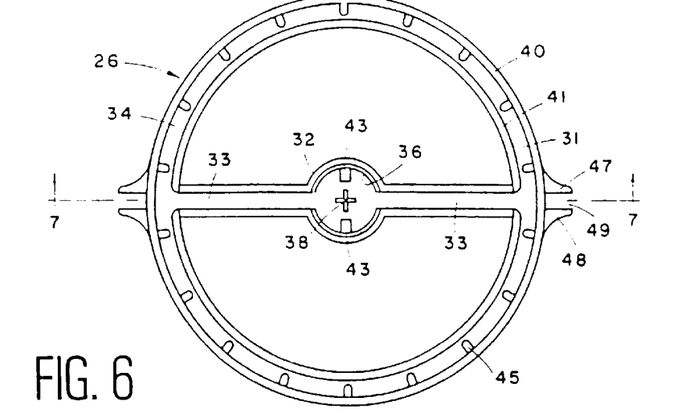
FIG. 6 is a top view of the bottom hemisphere of the spherical body in the device of FIG. 1.
Figure 7:
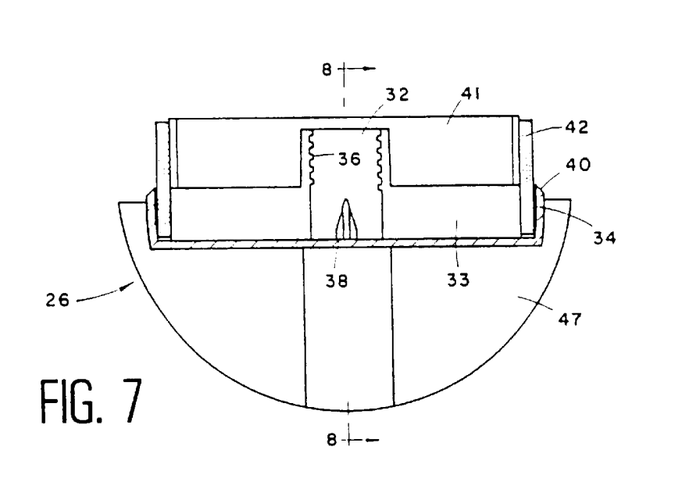
FIG. 7 is a cross-sectional view through lines 7—7 in FIG. 6.
Figure 8:
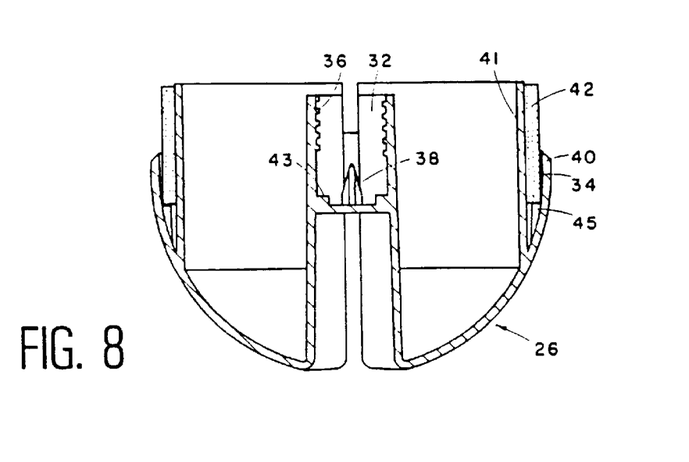
FIG. 8 is a cross-sectional view through lines 8—8 in FIG. 7.

Reference is now being made to FIGS. 6 to 8 showing the bottom hemisphere in somewhat more details. Bottom hemisphere 26 has a dish means 31 consisting of a central hub 32, radial ducts 33 and a circumferential trough 34. Hub 32 has an internal screw-thread 36 adapted to cooperate with the external screw-thread 19 of neck portion 17 of the container. At the center of the hub there is a piercer 38 which is adapted to pierce a membrane such as a metal foil or the like (not shown) at the discharge opening 20 of the container once the two are engaged. Trough 34 is defined between a skirt 40 and an internal cylindrical wall 41, and holds a cylindrical diffuser body 42 (absent for the sake of clarity from FIG. 6). Cylindrical diffuser body 42 rests on support bulges 45 which project from the skirt 40 leaving a clearance to allow free flow of liquid throughout the entire circumferential trough 34.

When the neck portion 17 of the container and the hub 32 are engaged, discharge opening 20 of container 12 is pierced open by the piercer 38, and then the insecticidal liquid contained therein is discharged into hub 32, and from these flow through ducts 33 and into liquid trough 34. Hub 32 is provided with stop means 43 which ensure that there will always be a clearance between the bottom surface of the hub and the lips of the discharge opening to ensure free flow of the liquid into ducts 33.

When trough 34 is filled with the insecticidal liquid, cylindrical diffuser body 42 becomes essentially uniformly soaked with the liquid and can diffuse it through gap 28 in the spherical body. Gap 28 allows insects to enter and upon contact with diffuser body 42 and/or ingestion of the insecticidal liquid thus perish.

Bottom hemisphere 26 is further provided with two lateral circumferential projections 47 and 48 which define between them a circumferential vertical groove 49.

Figure 9:
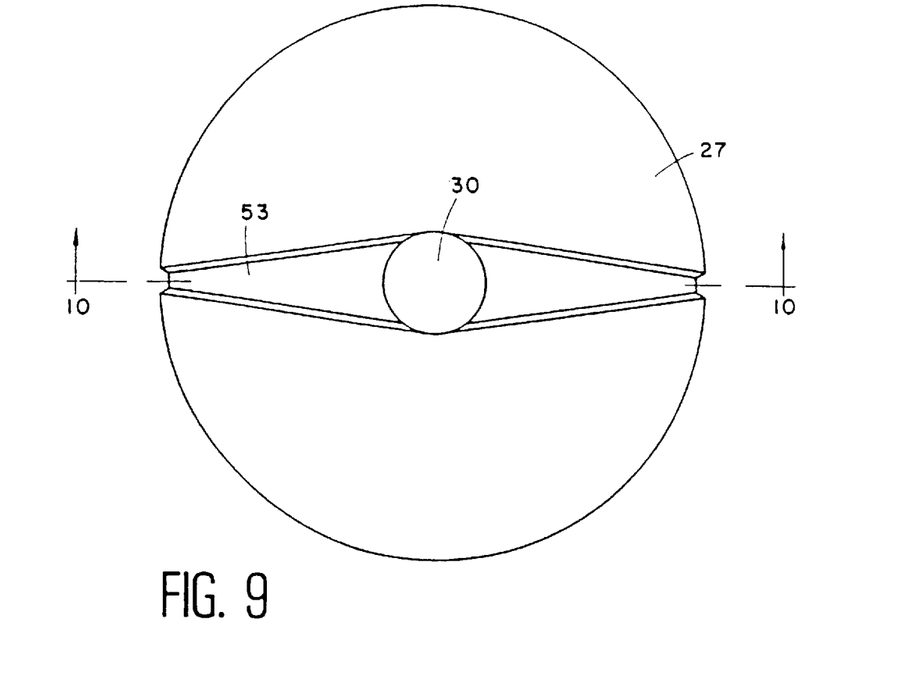
FIG. 9 is a top view of the top hemisphere of the spherical body in the device of FIG. 1.
Figure 10:
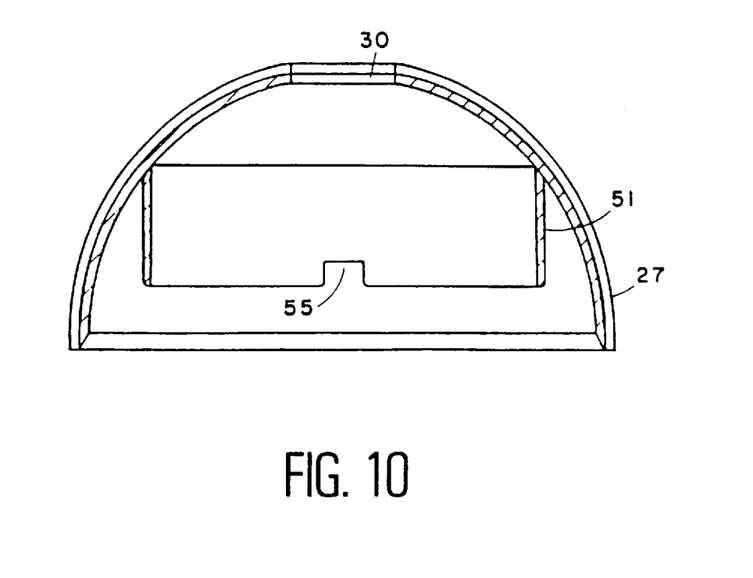
FIG. 10 is a cross section through lines 10—10 in FIG. 9.

Attention is now being directed to FIGS. 9 and 10 showing the upper hemisphere 27 of the spherical body 11. Hemisphere 27 has an opening 30 which is adapted, as already mentioned above, to receive the neck portion of container 12, The diameter of this opening is less than the external diameter of annular collar 21 of the container and as a result, when the container is fully screwed to the hub in the lower hemisphere (see above) the upper hemisphere 27 is tightly held between annular collar 21 and the lower hemisphere.

Hemisphere 27 has a downward cylindrical projection 51 which is of a slightly smaller diameter than cylindrical wall 41 and consequently when the two hemispheres are assembled together it juxtaposed cylindrical wall 41 from inside.

The diameter of the projection 51 and wall 41 may by adjusted, so that when the two hemispheres are pressed against one another they come into tight contact and thus hold the two hemispheres together.

Hemisphere 27 has further a circumferential vertical groove 53 which when assembled with hemisphere 26 is in register with groove 49 in hemisphere 26. The registrability of the two grooves is ensured by means of cut-out 55 which fit on the outside walls of ducts 33.

As can be seen in FIGS. 1 and 2, hemisphere 27 is slightly larger than hemisphere 26 and as a result, hemisphere 27 shades the diffuser body 42. This shading avoids excessive evaporation of the insecticidal liquid which may be caused by direct solar radiation, and prevents washing away of the insecticidal liquid by rain.

As already pointed out above, the spherical body is typically red and the panel is typically yellow. The combination of these two colors and the spherical shape of said spherical body are attractants of insects in insecticidal and fruit flick in particular, which feature thus improves the insecticidial activity of the device.

Figure 11:
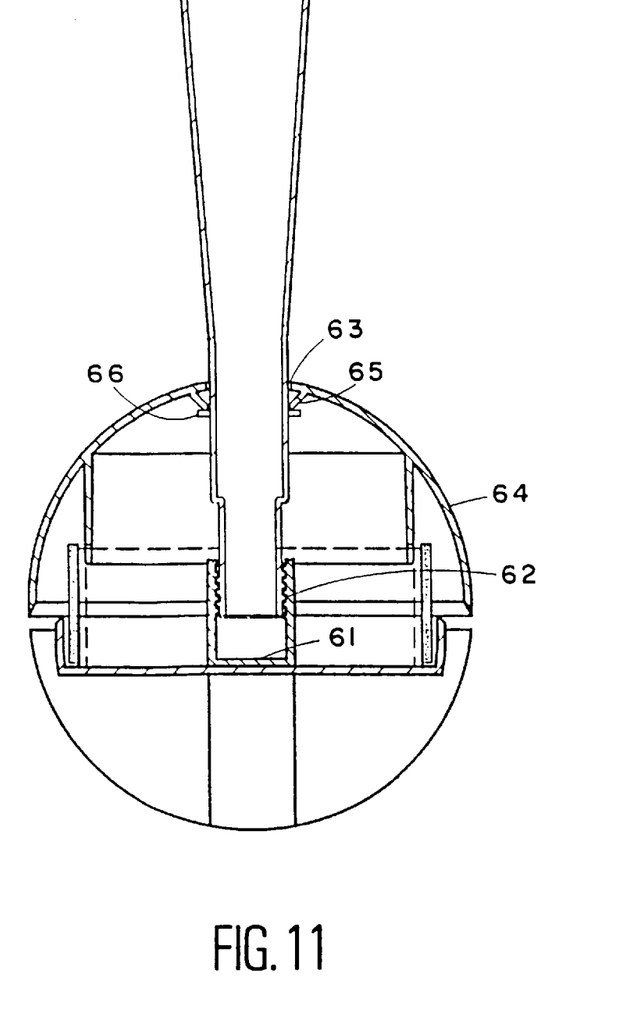
FIG. 11 is a side cross-sectional view of a spherical body and a liquid container in accordance with another embodiment of the invention.

FIG. 11 shows a slight modification from the embodiment of FIGS. 1–10. In accordance with this embodiment, the bottom surface 61 of hub 62 is essentially flat and serves for sealing the discharge opening of the container by tightly screwing the lips of the discharge opening of the container against this surface. By slightly unscrewing the container a gap is formed between the discharge opening and the surface 61 and liquid is released in a similar manner as that described in the embodiment of FIGS. 1–10.

In order to ensure that the bottle is not excessively unscrewed, opening 63 in the upper hemisphere 64 is provided with stop means 65 a which cooperate with collar 66 on the neck portion of the container for that purpose.

A device in accordance with this embodiment will usually be disposable as containers cannot be replaced.

Figure 12:
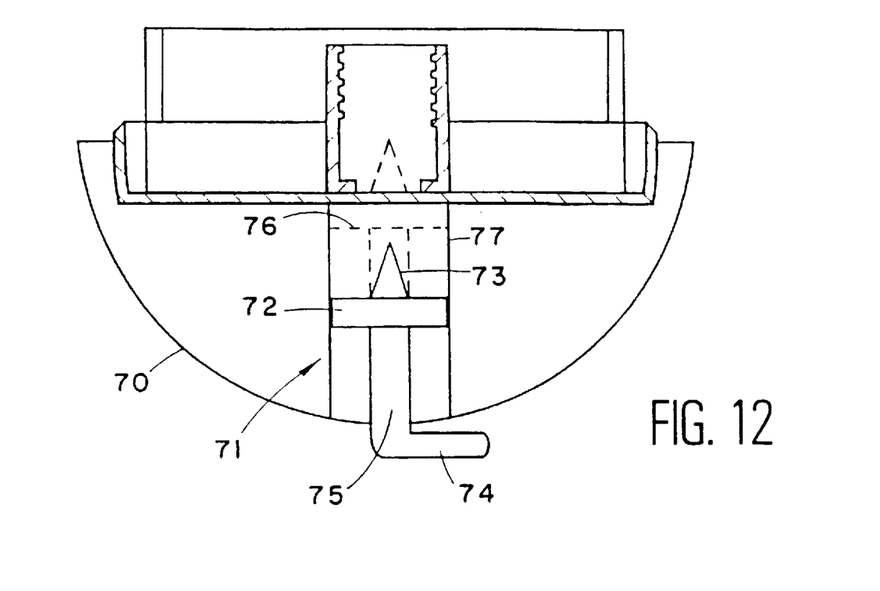
FIG. 12 shows a side cross-sectional view of the bottom hemisphere of the spherical body in accordance with an embodiment of the invention provided with a movable piercing device for piercing the discharge opening of the container.

Attention is now being made to FIG. 12 showing another embodiment of a spherical body, of which only the lower hemisphere 70 is shown. The lower hemisphere has a movable piercing means 71 consisting of piston 72 and a piercer 73. Movable piercing means are guarded against unintentional piercing by means of safety catch 74 which can be broken along a break line 75 upon the application of pressure. When the pressure is applied, piercing means 71 are elevated, as shown by dotted lines 76 and consequently the discharge opening of the container is pierced open. The liquid can then flow out of the discharge opening and into the liquid holding means, in a similar manner to that described in connection with the embodiment of FIGS. 1–10. Piston 72 in its upper position is pressed against the surrounding cylindrical walls 77 whereby downward leakage of insecticidal liquid is avoided.

Figure 13:
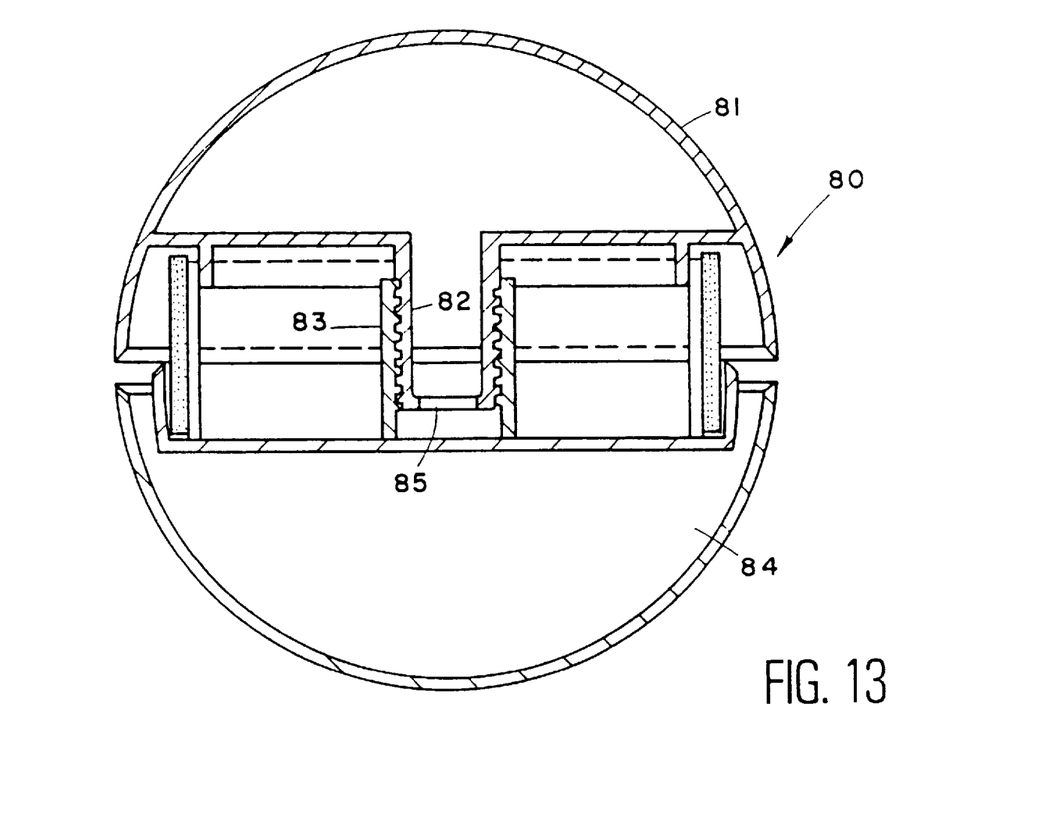
FIG. 13 is a longitudinal cross-sectional view through another embodiment of a spherical body.

Attention is now directed to FIG. 13 showing a spherical body 80 in accordance with a further embodiment of the present invention. The spherical body 80 has a top hemisphere 81 which serves as a container of the insecticidal liquid. Hemisphere 81 has a neck portion 82 which is screw engaged into hub 83 of the bottom hemisphere 84. By tightly screwing the two hemispheres against one another the discharge opening 85 is sealed and by slightly unscrewing, the discharge opening is opened. Here, also, it is possible to use a movable piercing means similar or different to those shown in FIG. 12.

Figure 14:
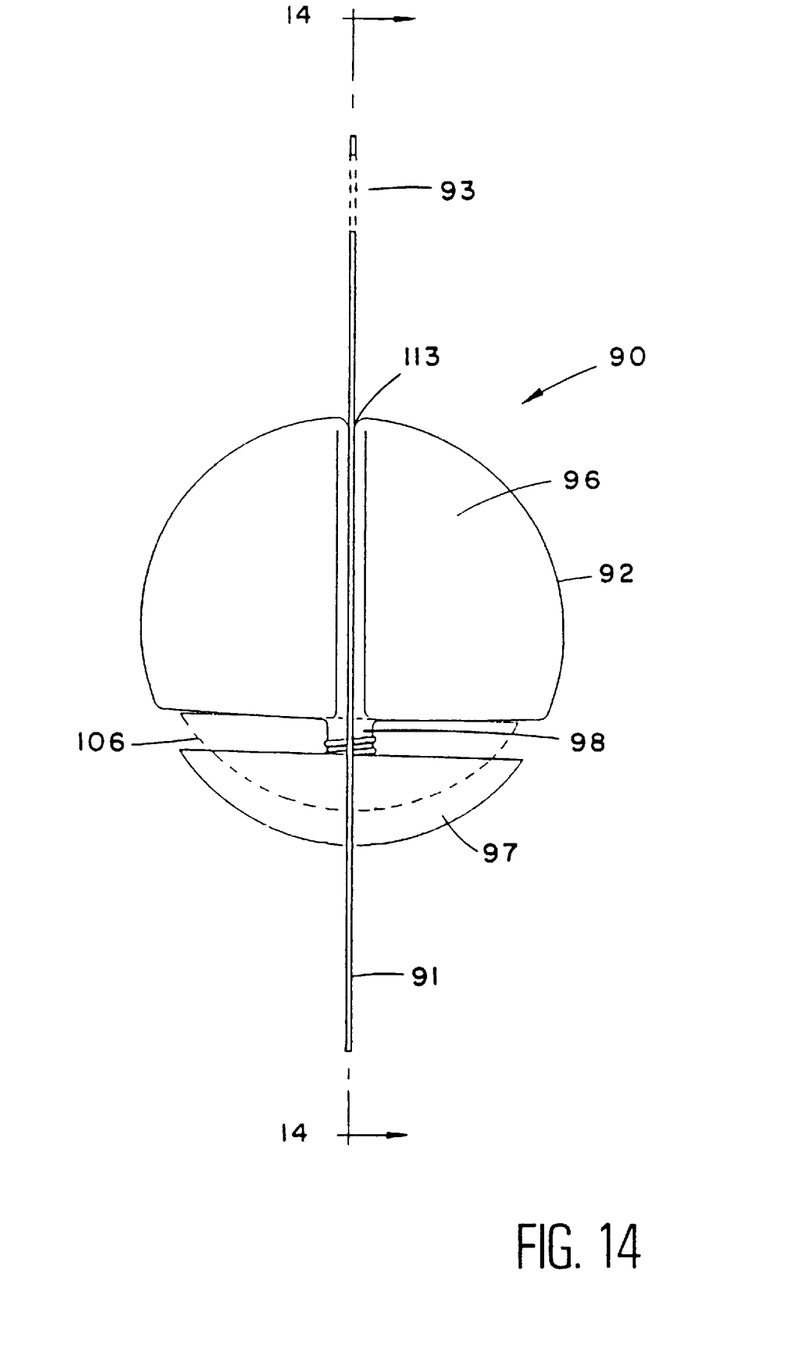
FIG. 14 shows a side elevation of a device according to a further embodiment of the first aspect of the invention.
Figure 15:
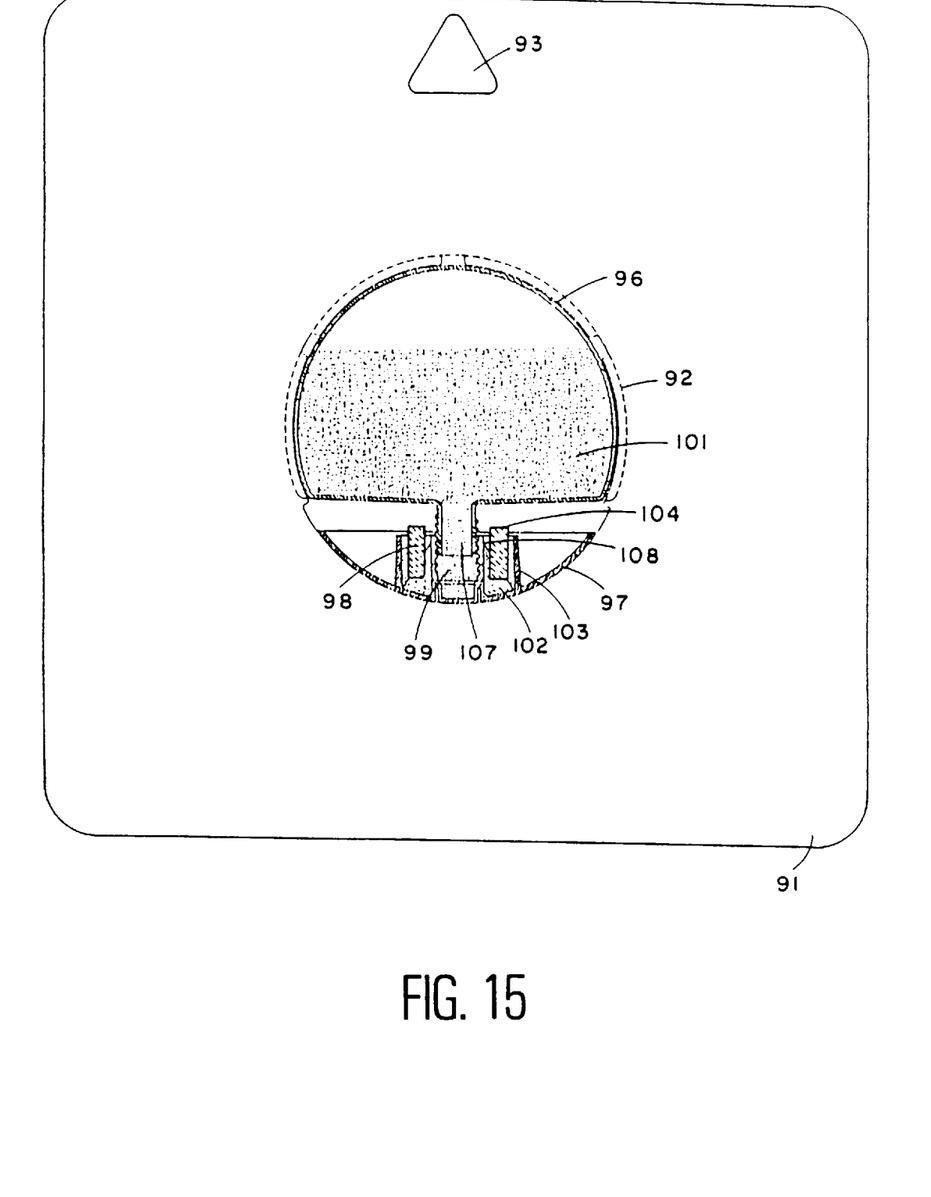
FIG. 15 is a cross-sectional view through lines 14—14 in FIG. 13.
Figure 16:
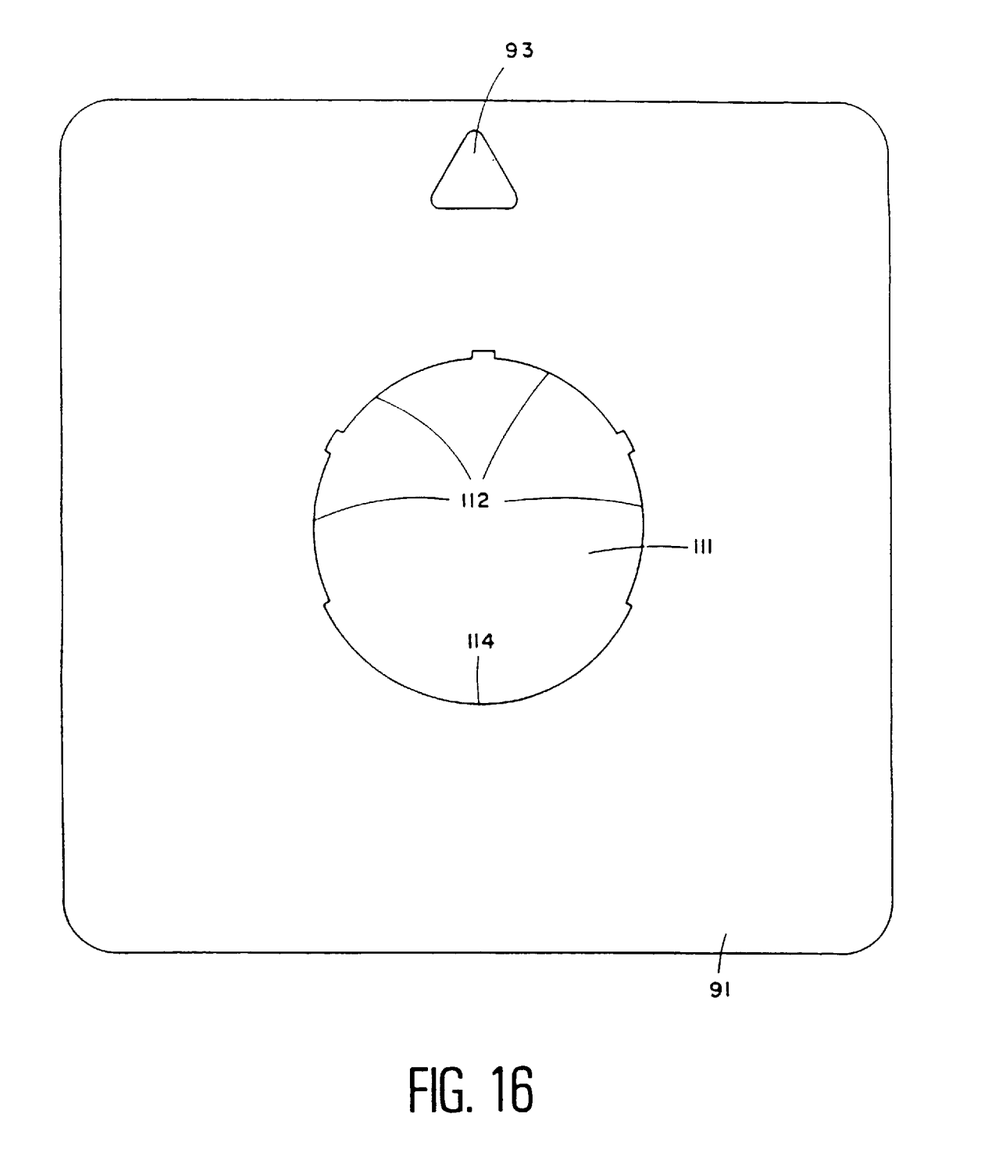
FIG. 16 is a front view of the panel of the device of FIGS. 13 and 14.

Reference is now being made to FIGS. 14, 15 and 16 showing an insecticidal device generally designated 90 consisting of a panel 91 and a spherical body 92. Panel 91 has an opening 93 at its top which serves for hanging the device. Spherical body 92 has an upper part 96 and a bottom part 97, engaged with one another by means of externally screw threaded neck portion 98 of part 96 and internally screw threaded cylindrical cap/retainer means 99.

Upper part 96 serves as a container for liquid 101 which contains a said substance such as a protein hydrolysate, a pheromone, a sugar, or another insect insecticide, and optionally also an insecticide. Bottom part has a central dish means 102 defined by upright walls 103. Dish means 102 holds a cylindrical diffuser body 104 which is made of an absorbent material.

In the closed state shown by a dotted line 106 in FIG. 14, bottom part 97 is tightly screwed against upper part 92 whereby means 99 seals opening 107 of neck portion 98. When the two parts 92 and 97 are unscrewed opening 107 is opened as shown in FIGS. 14 and 15, and liquid 101 flows out through opening 107, through ports 108 in the walls of cap/retainer means 99 and into dish means 102, whereby diffuser body 104 becomes soaked with the fluid. In the position shown in FIGS. 13 and 14 a gap is formed between parts 92 and 97 allowing diffusion of the liquid into the surrounding atmosphere and access of insects to the diffuser body.

Panel 91 as shown in FIG. 16 has a central opening 111 having a diameter essentially identical to that of the spherical body and having an internally protruding ears 112 which have an internal diameter essentially the same as that of groove 113 (see FIG. 14) in upper part 96 of spherical body 90.

For assembly of the device, spherical body 90 is forced into opening 111 until ears 112 come into retainment engagement with groove 113. Bottom part 97 can then be unscrewed to the position shown in FIG. 13 in which it presses against the bottom wall 114 of opening 111.

Figure 17:
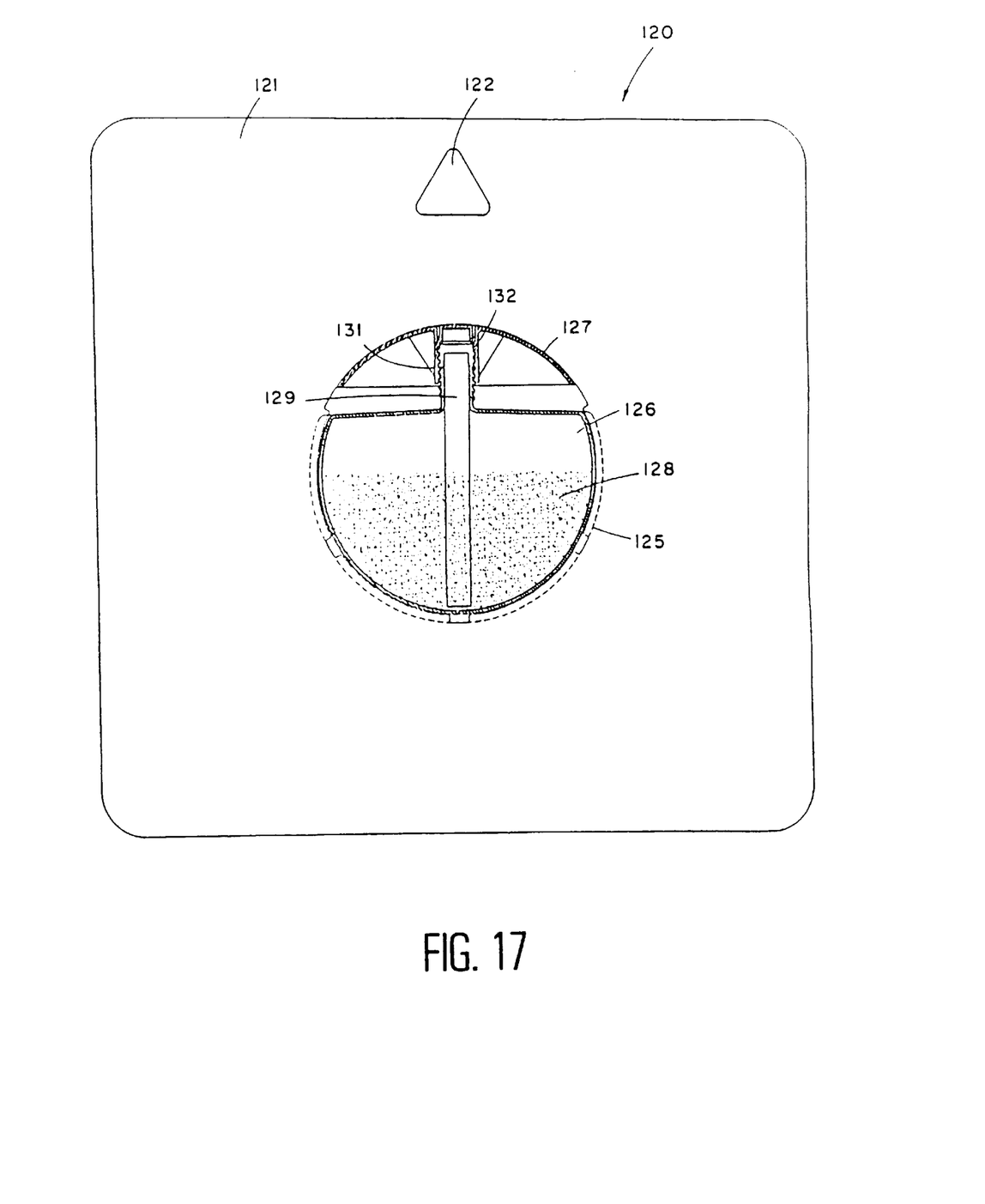
FIG. 17 is a cross-sectional view of an insecticidal device according to a further embodiment of the First aspect or the invention.

Reference is now being made to FIG. 17 showing a cross-section in a plane similar to that of FIG. 15 in another embodiment showing a device generally designated 120 having a panel 121 and a spherical body 122. Similarly as in the embodiment of FIGS. 14–16, the panel has an opening 123 at its top for hanging of the device, Spherical body 122 has a bottom part 126 and a top part 127. The top part 126 serves as a container for liquid 128 which comprises an attractant substance such as those mentioned above. The structure of upper part 127 is similar to that of bottom part 97 in the embodiment shown in FIGS. 14–16 and also the engagement between the two parts is similar as that in the other embodiment.

Embedded in the liquid 128 of bottom 126 is a wick 129 and upon unscrewing of upper part 127 to the position shown in FIG. 17, in which position the liquid can diffuse through ports 131 in the internally screw threaded cylindrical walls 132 whereby insects are attracted to the device.

In a device of the two embodiments shown in FIGS. 14–16 and FIG. 17, panel 91 and 121, respectively, are preferably coated by an adhesive substance whereby insects which are attracted to a spherical body and came into contact with the panel remain adhered thereto. In the case of the device of FIG. 15, insects destruction may also be achieved by means of an insecticidal substance present in liquid 101 whereby insects which come into contact or ingest the liquid from diffuser body 104, are destroyed.

Figure 18:
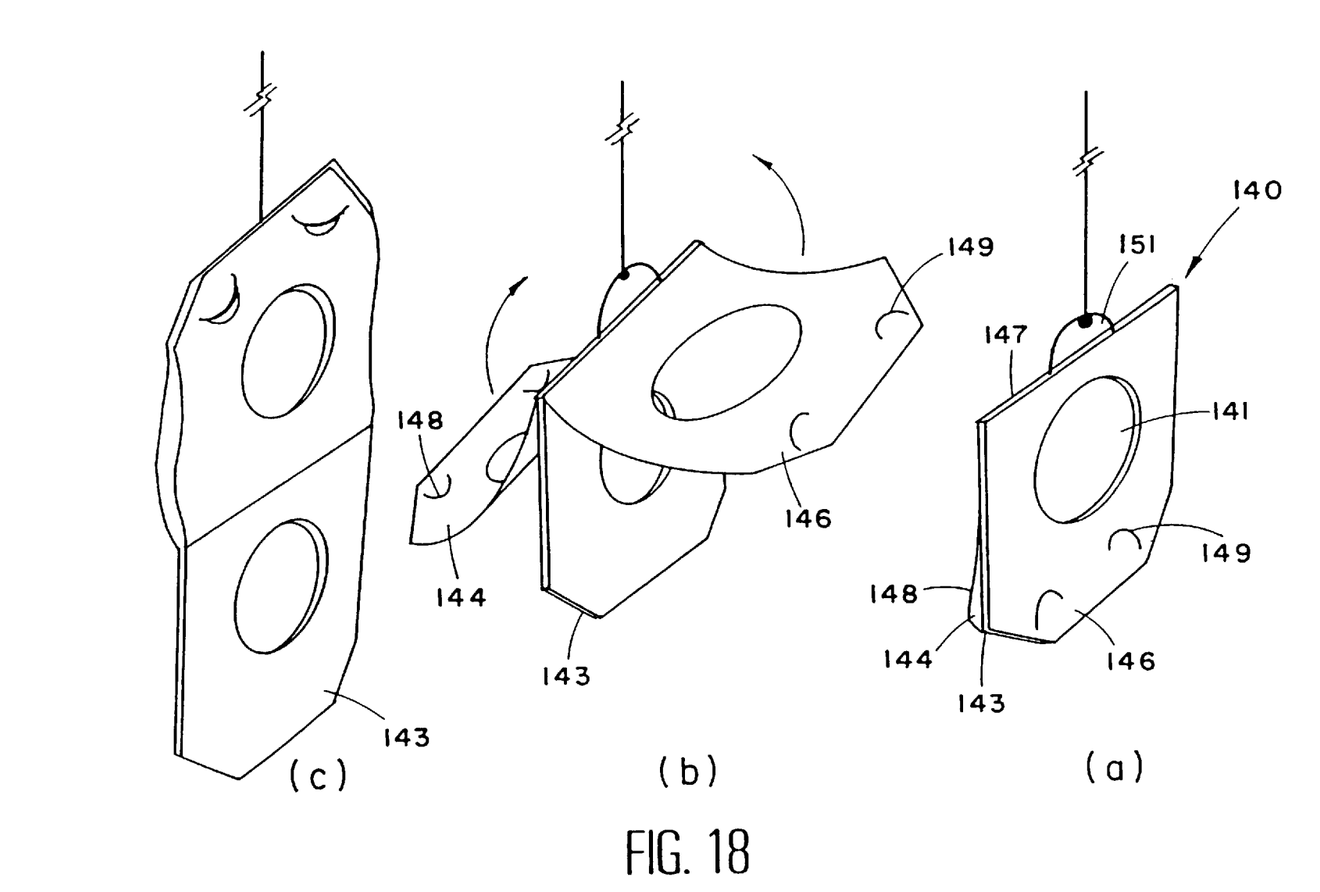

Reference is now being made to FIG. 18 showing a device in accordance with another embodiment of the invention in three operational states: a first, storage state (FIG. 18a) a second, intermediate state (FIG. 18b) and a third, working state (FIG. 18c). The device, generally designated 140 has a central opening 141 adapted to receive a spherical body similar to that of the embodiments shown in FIGS. 14–17. In accordance with another embodiment, the device 140 is an autonomous device, adapted for use by itself.

Device 140 has a panel 143, the two faces of which are covered by flexible sheets 144 and 146, both of which are fixed to edge 147 of panel 143. Each of sheets 144 and 146 has respective catch means 148 and 149 (with respect to 148 see FIG. 18b). Device 140 has also hanging means 151.

In the storage state shown in FIG. 18a, flexible sheets 144 and 146 cover each one face of panel 143. An adhesive substance (not shown) is essentially uniformly disposed between each flexible sheet and its respective face of the panel. When the two sheets are detached from the panel, the adhesive coated faces of the panel 143 are exposed. The two flexible sheets can be folded upwards whereby their faces which in the storage state face outwards, become to face one another and the sheets are retained in that state by means of respective catches 148 and 149 as shown in FIG. 18c.

Panel 143 is typically of a yellow color. In the autonomous embodiment of this device, rather than having a central hole 141, the panel may have a central circular differently colored portion, e.g. red colored, whereby the red-yellow color contrast facilitates the attraction of the insects.

Sheets 144 and 146 may be transparent or, alternatively, these sheets may have the same color as that of the panel whereby after the sheets come into the position shown in FIG. 18c, an enlarged panel is formed. For this purpose, the adhesive substance may be made to adhere to both the panel and the sheets.

We claim:

1. A device for combating insects by attracting insects and then destroying them following their arrival on said device, comprising:

a spherical body holding a liquid, said body having at least one opening for diffusing the liquid into the surrounding atmosphere, the liquid containing an insect attractant;

a panel of a color which has insect attracting properties, said panel having an aperture, wherein said spherical body is located within said aperture in a manner so that two hemispheres projecting each from one face of said panel are defined, and insect destroying means comprising an adhesive coating on said panel, whereby insects once landing on said panel become adhered thereto;

wherein said spherical body comprises a top part and a bottom part, said top part defines an enclosure adapted to hold the liquid, and said bottom part includes a dish adapted to hold the liquid, the liquid in said top part being emptied into said dish through one of said at least one opening.

2. A device according to claim 1 further comprising an adhesive coating on said spherical body.

3. A device according to claim 1 wherein said bottom part includes a wick which diffuses the liquid into the surrounding atmosphere.

4. A device according to claim 1 wherein said insect destroying means further comprises an insecticide comprised within the liquid and means within said spherical body allowing access of the insects to the liquid, such that insects once coming into contact with the liquid, are killed by the insecticide.

5. A device according to claim 1 wherein said spherical body has a red color.

6. A device according to claim 1 further comprising a liquid container associated with said spherical body, wherein liquid contained in said liquid container is transferred into said spherical body.

7. A device according to claim 1 wherein said liquid container forms part of said panel.

* * * * *